Patented Mar. 8, 1932

1,848,913

UNITED STATES PATENT OFFICE

JOHN M. TAYLOR, OF BRIDGEPORT, PENNSYLVANIA, ASSIGNOR, BY MESNE ASSIGNMENTS, TO CONTINENTAL-DIAMOND FIBRE COMPANY, OF NEWARK, DELAWARE, A CORPORATION OF DELAWARE

SYNTHETIC RESIN COATING MATERIAL

No Drawing. Application filed June 18, 1926. Serial No. 116,973.

This invention relates to improvements in protective coatings employing synthetic resins such as phenolic condensation products, and more particularly phenol formaldehyde reaction products.

The principal object of the invention is to provide a coating material of this type affording certain advantages in manufacture and in the operation of applying it to the surfaces to be protected not afforded by resinous protective coatings as made prior to my invention.

Heretofore it has been customary to form varnishes of synthetic resins by treating the resin in its soluble and fusible state with suitable solvents and applying the solution to the surfaces to be coated. In some instances, the coating after application has been heat treated to partially or entirely convert the resin to its hard and infusible condition, in which condition it is obviously desirable that the resin shall be.

I have discovered that a coating substance possessing many of the advantages of the hardened coating described above, and which is both simpler to manufacture and more easily applied, may be formed by taking a synthetic resin in its final hard infusible and insoluble state, grinding the hard resin body into a fine powder, and mixing this powder with varnish, drying oil or any suitable carrying or film-forming medium, this being applied either by brushing or spraying to the surfaces to be protected. Suitable coloring matter may be added at any desired point in the course of manufacture.

A coating material thus formed possesses the protective characteristics conferred by the hardened synthetic resin, is easy to manufacture, easy to apply and eliminates the necessity for heat treatment after application to polymerize the resin.

I claim:

1. A coating material comprising a drying oil and a finely divided hardened synthetic resin.

2. As a new article of manufacture, a varnish composition in a condition of fluidity rendering it suitable for painting purposes having incorporated therein a finely divided synthetic resin in its final infusible, insoluble stage.

3. As a new article of manufacture, a varnish composition having incorporated therein as its only synthetic-resin constituent a finely divided synthetic resin in its final infusible, insoluble stage.

4. The method of increasing the protective qualities of varnish compositions of the class normally lacking a synthetic resin constituent, which consists in incorporating therein a finely divided synthetic resin in its final infusible, insoluble stage.

JOHN M. TAYLOR.